United States Patent [19]
Begun

[11] Patent Number: 5,146,582
[45] Date of Patent: Sep. 8, 1992

[54] DATA PROCESSING SYSTEM WITH MEANS TO CONVERT BURST OPERATIONS INTO MEMORY PIPELINED OPERATIONS

[75] Inventor: Ralph M. Begun, Boca Raton, Fla.

[73] Assignee: International Business Machines Corp., Armonk, N.Y.

[21] Appl. No.: 368,449

[22] Filed: Jun. 19, 1989

[51] Int. Cl.⁵ .............................................. G06F 13/00
[52] U.S. Cl. ............................. 395/500; 364/DIG. 2; 364/927.93; 364/927.97; 364/927.98
[58] Field of Search ............................. 395/425, 500; 364/200 MS File, 900 MS File

[56] References Cited

U.S. PATENT DOCUMENTS

| | | | |
|---|---|---|---|
| 3,710,348 | 1/1973 | Craft | 340/172.5 |
| 4,360,891 | 11/1982 | Branigin et al. | 364/900 |
| 4,509,113 | 4/1985 | Heath | 364/200 |
| 4,716,545 | 12/1987 | Whipple et al. | 364/900 |
| 4,802,085 | 1/1989 | Levy et al. | 364/200 |
| 4,807,183 | 3/1989 | Kung et al. | 364/900 |
| 4,851,990 | 7/1989 | Johnson et al. | 364/200 |
| 5,019,965 | 5/1991 | Webb, Jr. et al. | 364/200 |
| 5,029,124 | 4/1991 | Leahy et al. | 364/900 |

OTHER PUBLICATIONS

"80386 Hardware Reference Manual", Intel Corp., 1986, Chaps. 1-2, pp. 3/14-3/17.
"i486 Microprocessor," Intel Corp., 1989, Sections 2.0, 6.1, 6.2.7, and 7.2-7.2.7.

Primary Examiner—Thomas C. Lee
Assistant Examiner—Richard Lee Ellis
Attorney, Agent, or Firm—Mark P. Kahler

[57] ABSTRACT

A data processing system includes a microprocessor operable in a burst mode to read data from a memory. The memory, its controller and bus are operable in a pipelining mode. Array logic is connected between the microprocessor and the remaining elements for converting the burst mode to the pipeline mode.

3 Claims, 2 Drawing Sheets

DATA PROCESSING SYSTEM WITH MEANS TO CONVERT BURST OPERATIONS INTO MEMORY PIPELINED OPERATIONS

FIELD OF THE INVENTION

This invention relates to data processing systems and, more particularly, to data processing systems in which a microprocessor, operable in a burst mode, can be used in a system primarily designed to operate in a pipelined mode.

BACKGROUND

The IBM Personal System/2 Model 70 386, machine number 8570-A21, is a known, commercially available personal computer that uses a 32 bit, 80386 microprocessor commercially available for Intel Corporation. Such computer provides relatively high performance due at least in part to a design in which data is transferred over a bus in pipelined fashion. As is well known, the operation of a computer is cyclic in that a clock divides the operation into clock or machine cycles which time the various operations so that they can occur in proper sequence. In order to transfer data between memory and a microprocessor, for example, the address in memory of where the data will be written into or read from, is first placed on the bus during one cycle, followed shortly thereafter in the next cycle by the data being placed on the bus. When successive units of data are to be transferred, a non-pipelined transfer mode can be used in which successive addresses and data units are transferred on successive cycles without there being any overlap. In a pipelined mode of operation, the address of a subsequent data unit is placed on the bus while the preceding data unit is being transferred so that data units are transferred on successive machine cycles, instead of on every other cycle. Recently, a newer 32 bit microprocessor has become commercially available from Intel Corporation, it being known as the 80486 microprocessor. This microprocessor includes a central processing unit (CPU), a cache unit, a floating point unit, and a memory management unit formed on the same chip. In contrast, the latter three units were provided as separate chips in the personal computer described in the preceding paragraph.

The 80486 microprocessor is operable in a burst mode and a non-burst mode. In non-burst mode, data is strobed onto the bus between the microprocessor and a memory controller at a maximum rate of one data unit every two clock periods or cycles. Such data units comprise 32 bits (4 bytes) of information. During a burst cycle, sixteen bytes are fetched from system memory in one continuous stream or packet of information. This requires that four double words (32 bits-4 bytes) be strobed onto the bus in as few as four successive clock cycles. The burst cycle thus provides four 32 bit accesses using a single address strobe (ADS) at the beginning of the cycle, and the cycle generates a predictable sequence of four memory accesses. There are two primary advantages to the burst cycle. First, it allows the system memory interface to see a single address strobe for a packet of 16 bytes that follow a predictable sequence, thus possibly eliminating the time required to strobe each of the four double words into the memory as separate cycles. Second, the burst cycle provides a convenient means for the microprocessor to fill the on-chip cache. Such cache has a line size of 16 bytes and the burst cycle can fill the cache one line at a time by providing the required 16 bytes.

Given the objective of converting a personal computer using a 80386 microprocessor into a higher performance system using the 80486 microprocessor, a problem arises because the 80486 does not support pipelining and the existing memory interface will not operate efficiently, thereby limiting system performance. The invention solves one aspect of how this new microprocessor can be substituted for the old microprocessor in the above-mentioned personal computer and achieve a high performance operation without having to make extensive hardware changes.

SUMMARY

Thus, one of the objects of the invention is to provide a personal computer which has a bus system operable in a pipelined mode and which uses a microprocessor which supports a burst mode of operation.

Another object is to provide a personal computer having a microprocessor that operates in a burst mode, with means for converting such burst mode of operation into, a pipelined mode so that no changes need be made to existing memory interface logic.

Briefly, the manner in which the above and other objects of the invention are achieved is to provide additional logic connected between the microprocessor and the memory logic and bus system which logic performs the functions of converting the burst mode as seen by the microprocessor into a pipelined mode as seen by memory logic.

DRAWINGS

Other objects and advantages of the invention will be apparent from the following description taken in connection with the accompanying drawings wherein.

DESCRIPTION

Figure 1:
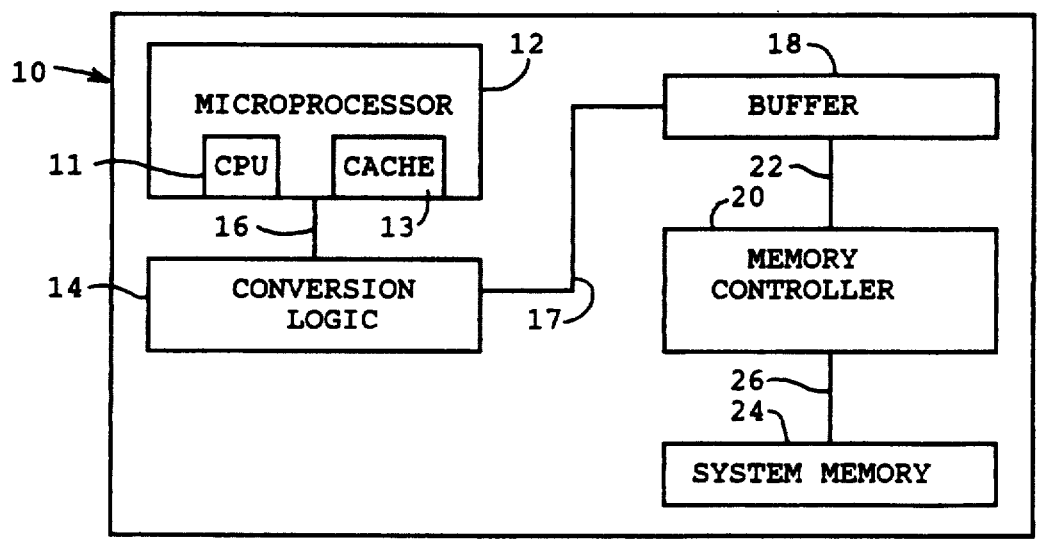
FIG. 1 is a schematic block diagram of a personal computer embodying the invention.

Referring now to the drawings, and first to FIG. 1, a personal computer 10 includes a microprocessor 12 connected to conversion logic 14 by a bus 16. Microprocessor 12 is a 80486 microprocessor commercially available from Intel Corporation and described in a publication, "i486 TM Microprocessor", dated April 1989, Order number 24040-001. The conversion logic 14 is described in more detail below, and generally functions to convert the burst mode of operation generated by microprocessor 12 into a pipelined operation as seen by the rest of the system. Microprocessor 12 includes an on-chip CPU 11 and cache 13. The remaining elements now to be described are the same as corresponding elements of the above-mentioned Model 70 386 personal computer, and only so much of their function and operation as is useful in understanding the operation of the invention, need be described. Logic 14 is connected to a buffer 18 by a bus 17. Such buffer is connected to memory controller 20 via bus 22. A random access memory 24 is connected to controller 20 by bus 26. Memory 24 serves as the system memory. The addresses supplied by the microprocessor 12 and logic 14 to controller 20 and known as the "system" addresses, and the addresses supplied by controller 20 to memory 24 are known as the "memory" addresses.

Figure 2:
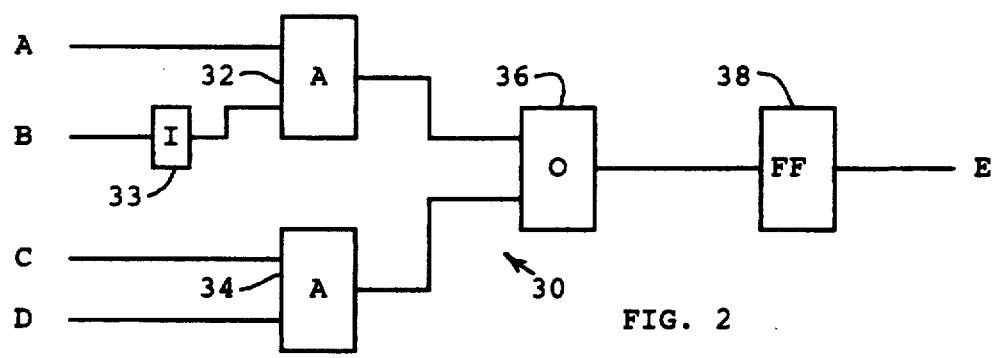
FIG. 2 is a schematic diagram useful in understanding operation of programmable array logic (PAL) used in the invention shown in FIG. 1.

Conversion logic 14 comprises conventional PAL means programmed to operate in the manner described in detail below relative to FIG. 3. Before describing details of such logic, a discussion of the logic statements will be helpful. PALs are known devices in which AND, OR, INVERT and FLIP FLOP logic circuits are customized in accordance with the desired logic. Thus, by way of example, FIG. 2 shows a section of a PAL comprising two AND circuits 32 and 34, and OR circuit 36, an invert circuit 33, and a flip flop 38 connected to provide an output signal E, responsive to a clock signal CLK, that is a logical combination of input signals A-D. This logic can be represented as follows:

| E | := A & !B | (1) |
|---|---|---|
|   | # C & D; | (2) |

In statement 1, the characters ":=" act as a delimiter signifying that the output signal E of flip flop 38 is formed by the logical combination of the succeeding signals. There is one statement per AND circuit. "&" represents a logical AND combination, "#" represents an OR combination, and "!" is the NOT or invert function.

Conversion logic 14 is formed from two PAL devices. The first device receives the following input signals having the indicated functions:

| SIGNAL | FUNCTION |
|---|---|
| CLK | 25 MHZ CPU CLOCK |
| ADS | −CPU ADS |
| CPURDY | −CPU READY |
| BURSTRDY | −CPU BURST CYCLE READY |
| BLAST | −CPU BURST LAST |
| RESET | +RESET |
| MISS1 | BUS ADS FOR BURST CYCLES |
| NACACHE | PIPELINE REQUEST FOR NEXT ADDR |
| CNT0 | BURST COUNT LSB |
| A2 | CPU A2 |
| A3 | CPU A3 |
| CACHEABLE | −CACHEABLE MEMORY READ CYCLE |
| BUSCYC486 | −CPU BUS CYCLE |

The first PAL provides the following output signals:

| SIGNAL | FUNCTION |
|---|---|
| DELAYNA | DELAYED NA TO HOLD NEWA2 |
| LA3 | LATCHED A3 |
| NEWA2 | A2 TO 18 AND 20 |
| NEWA3 | A3 TO 18 AND 20 |

The logic of the first PAL is given by the following statements:

| !DELAYNA | := !CACHEABLE & DELAYNA & !NACACHE & BURSTRDY |
| | # !DELAYNA & !CACHEABLE & BURSTRDY; |
| !LA3 | := !ADS & !A3 |
| | # !A3 & ADS; |
| !NEWA2 | := !ADS & !A2 |
| | # !NEWA2 & !BUSCYC486 & ADS & CACHEABLE |
| | # !NEWA2 & !CACHEABLE & NACACHE & BURSTRDY & CPURDY |
| | # !NEWA2 & !CACHEABLE & !DELAYNA |
| | # NEWA2 & !NACACHE & !CACHEABLE & DELAYNA; |
| !NEWA3 | := !ADS & !A3 |
| | # !NEWA3 & !BUSCYC486 & ADS & CACHEABLE |
| | # !NEWA3 & !CNT0 |
| | # !NEWA3 & LA3 & !CACHEABLE |
| | # !NEWA3 & !CACHEABLE & NACACHE & BURSTRDY & CPURDY |
| | # NEWA3 & LA3 & !CACHEABLE & CNT0 & !NACACHE; |

The second PAL device receives input signals and provide output signals as follows:

| INPUT | FUNCTION |
|---|---|
| CLK | 25 MHZ CPU CLOCK |
| ADS | −CPU ADS |
| CPURDY | −CPU READY |
| BURSTRDY | −CPU BURST CYCLE READY |
| BLAST | −CPU BURST LAST |
| RESET | +RESET |
| KEN | −CACHEABLE CYCLE DECODE |
| PCD | +CACHEABLE PAGE FROM 80486 |
| MIO | CPU +MEMORY/−IO |
| WR | CPU +WRITE/−READ |
| DC | CPU +DATA/−CODE |
| CPULOCK | −CPU LOCK |
| NACACHE | −PIPELINE REQUEST FOR NEXT ADDR |
| BOFF | −CPU BACKOFF |
| OUTPUT | FUNCTION |
| BADS | −BUS ADS |
| CACHEABLE | −CACHEABLE MEMORY READ 80486 |
| CNT1 | MSB COUNTER BIT, BURST CYCLES |
| CNT0 | LSB COUNTER BIT, BURST CYCLES |
| BUSCYC486 | −CPU BUS CYCLE |
| MISS1 | −BUS PIPELINED ADS |

The logic of the second PAL is given by the following statements:

| !BUSCYC486 | := !ADS & !RESET & BOFF |
| | # !BUSCYC486 & CPURDY & BURSTRDY & !RESET |
| | # !BUSCYC486 & CPURDY & BLAST & !RESET; |
| !CACHEABLE | := !BUSCYC486 & !WR & MIO & !PCD & !KEN & !RESET & CPULOCK & CACHEABLE |
| | # !CACHEABLE & CPURDY & BURSTRDY & !KEN & !RESET |
| | # !CACHEABLE & CPURDY & BLAST & !KEN & !RESET; |
| !CNT1 | := !ADS & !WR & MIO & !PCD & !RESET & BOFF |
| | # !CNT1 & CNT0 & BURSTRDY & CPURDY & !RESET |
| | # !CNT1 & !CNT0 & CPURDY & !RESET; |
| !CNT0 | := !ADS & !WR & MIO & !PCD & !RESET & BOFF |
| | # CNT0 & !CNT1 & !BURSTRDY & CPURDY & !RESET |
| | # !CNT0 & BURSTRDY & CPURDY & !RESET; |
| !BADS | := !ADS & !RESET & BOFF; |
| !MISS1 | := !CACHEABLE & BLAST & !KEN & !RESET & !(CNT0 & CNT1) & MISS1 |
| | # !MISS1 & BURSTRDY & CPURDY & RESET; |

Figure 3:
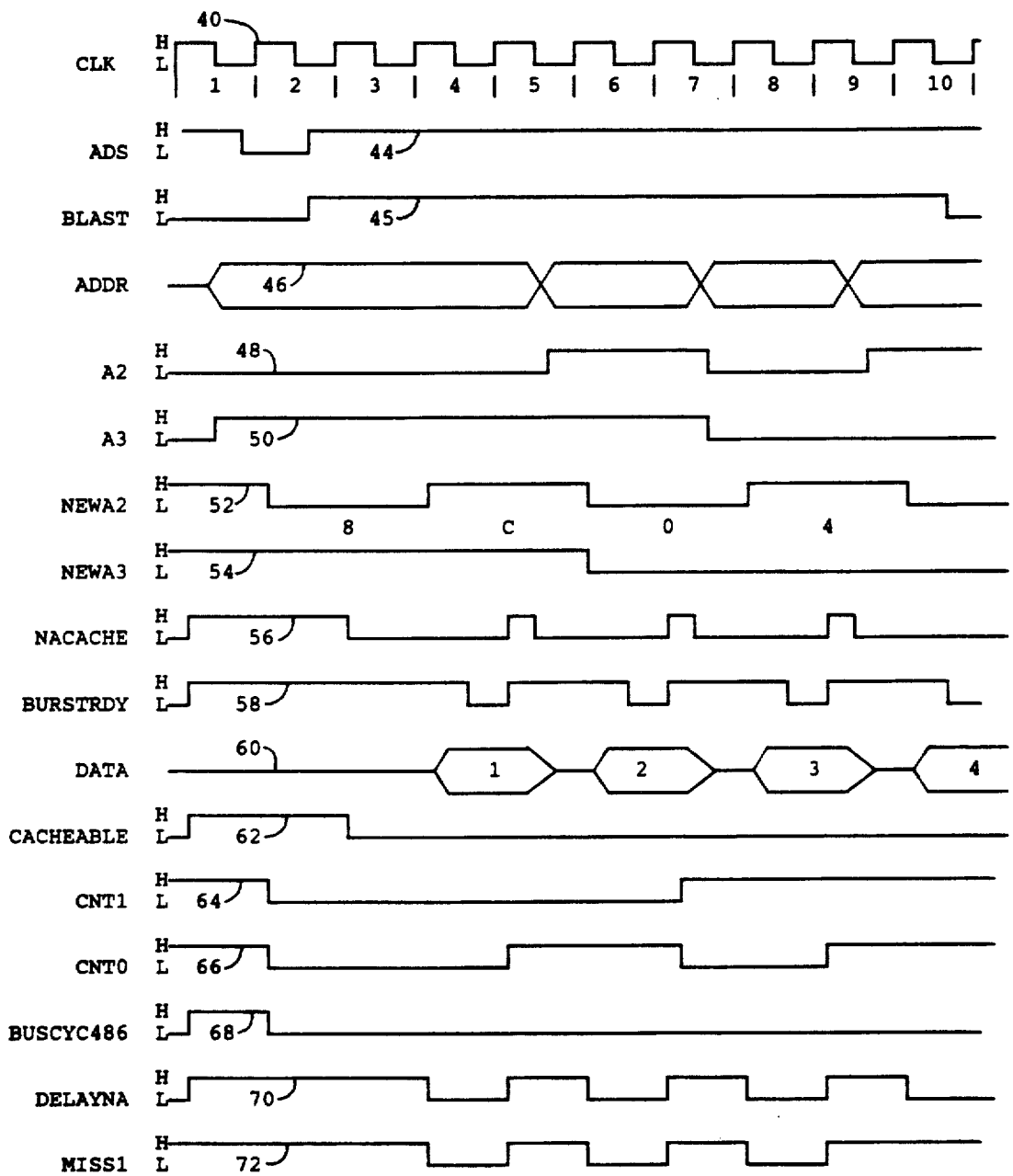
FIG. 3 is a timing diagram illustrating various signals used in the operation of the invention.

Before describing the operation of the system relative to the timing diagram in FIG. 3, certain aspects of the operation of microprocessor 12 are to be noted. When the on-chip cache is enabled, read requests first look to the cache from which the data will be read when a cache hit occurs. If no hit occurs, a read request for the data will be made on the external bus. If the address is in a cacheable portion of memory, microprocessor 12 initiates a cache line fill during which a sixteen byte line is read into the cache.

The addresses of data items transferred in a burst cycle are related and fall within a sixteen byte aligned area corresponding to a cache line. The first double word to be transferred includes the desired byte included in the read request, and subsequent doublewords are transferred in a predetermined order known as the "burst and cache line fill order". In the example used in connection with FIG. 2, the burst order is the 8-C-0-4 double words.

Referring now to FIG. 3, the following description utilizes only the names of the signals to describe the operation. CLK 40 is the system clock where the rising edge of such signal is used to provide timing synchronization. A cache line fill cycle requires ten clock periods to transfer sixteen bytes into cache 11, the clock periods or cycle being numbered 40-1 through 40-10. Various signals mentioned above are omitted from FIG. 3 for simplicity, but need to be at predetermined levels in order for the burst mode of processor 12 and the pipelined mode of the memory interface to be effective. Thus, KEN is low, CPURDY is high, RESET is low, and MIO is high to indicate a memory access, throughout the illustrated timing interval.

A cache line fill cycle begins when the CPU provides an active ADS 44 and the address ADDR 46 of the first double word to be read from the memory into the cache and CPU. During clock period 40-2, the CPU activates BLAST 46 which remains active until the tenth cycle 40-10 when it falls to signify the end or last of the cycle. ADDR 46 comprises address bits A31-A4 which define the cache line of sixteen bytes being fetched. Address bits A2 and A3 are provided by the CPU as signals 48 and 50. The complete address (bits A31-A2) of the double word being fetched are provided by the combination of signals 46, 48 and 50, such address being random for the first data item being read. After being initially provided, bits, A2 and A3 are toggled in a predetermined manner to provide the predetermined cache fill line sequence, except that the active signals A2 and A3, after the first set, are too late in the burst cycle to be of use in pipelining.

Logic 14 intercepts bits A2 and A3 during the first bus cycle 42-1 and generates new address signals NEWA2 52 and NEWA3 54 therefrom. While the active signals 52 and 54 are initially random in he same manner as are corresponding signals A2 and A3, the subsequent active signals 52 and 54 generated by logic 14 will be in accordance with the cache line fill sequence. In the specific example, NEWA2 52 and NEWA3 54 represent the 8-C-0-4 fill sequence. Note that signals 52 and 54 are toggled or changed before corresponding signals 48 and 50.

NACACHE 56 is a signal from the external system, used for pipelining. Each active (low) NACACHE 56 is a request from memory controller 20 for the address of the next data item to be fetched. Microprocessor 12 has no next address request input pin corresponding to that of an 80386 microprocessor, with the consequence that processor 12 cannot directly support pipelining. However, logic 14 does use the NACACHE 56 signals to give the appearance to the external system of pipelining support. Thus, the external system generates four active NACACHE 56 signals indicating the system memory is ready to accept new addresses for read operations.

Memory controller 20 generates a BURSTRDY 58 signal which becomes active when active data signals 60 are placed on the data bus, and signal 58 is used by the microprocessor to strobe the data into the microprocessor for filling the cache line. The first data item 60-1 becomes active during the fourth clock cycle, and the succeeding data items 60-2, 60-3 and 60-4 become active during the succeeding clock cycles 40-6, 40-8 and 40-10. It should be noted that in accordance with pipelining, the active signals NEWA2 and NEWA3 appear about one bus cycle before the data items addressed thereby, and that the address active addresses of subsequent data items are concurrent with active preceding data items.

The remaining illustrated signals will now be only briefly discussed, since the more detailed operation is set forth in the above description of the PAL logic. An active CACHEABLE 62 signal indicates a cacheable memory read access is in progress. CNT0 and CNT1 signals 66 and 64 are count bits that track which segment of the burst cycle is active. BUSCYC486 68 indicates microprocessor 12 is executing an external bus cycle. DELAYNA 70 and LA3 71 (not shown in FIG. 3) signals are internal latch items used by logic 14. MISS1 72 is a logic output signal used by the external system as an additional address strobe signal. Since the external memory interface always generates pipeline requests on cacheable memory reads, no pipeline request input is required into the MISS1 logic, it is assumed to be active. MISS1 strobe goes active for the second, third and fourth segments of the burst cycle. Thus, of the four segments, the first will appear as a non-pipelined cycle and the following three will appear pipelined.

It should be obvious to those skilled in the art that the specific number of clock cycles is a function of the system clock and circuit speeds and can be varied. Other changes can be made in the details and the arrangement of parts without departing from the scope of the invention as defined in the appended claims.

What is claimed is:

1. In a data processing system having a system memory comprising a multiplicity of addressable memory locations for storing a multiplicity of data items, bus means including a data path connected to said system memory for transferring data into and out of said system memory, and a memory controller connected to said bus means and being operative in response to receiving a first series of pipelined system addresses on successive bus cycles to convert each system address into a corresponding memory address and transmit each such memory address to said system memory for reading a series of data items from said system memory and placing such data items on said data path on successive bus cycles whereby the first data items in said series is placed on said data path at a time after the time when the first one of said first series of system addresses is received by said memory controller and whereby said system addresses of data items subsequent to said first data items are received by said memory controller concurrently with reading of preceding data items so as to provide pipelining of addresses with data, said memory controller being further operative to generate a plurality of NACACHE control signals for requesting pipeline addressing by said first series of system addresses and of BURSTRDY control signals indicating when data items have been placed on said data path, the combination comprising:

a processor operable in a burst mode of operation to read said series of data items from said system memory, said processor lacking means to receive and act in response to said NACACHE signals, said processor being connected to said bus means and operative to generate during each burst operation and transmit on said bus means a plurality of burst mode signals comprising a single control signal (ADS) for initiating said burst mode, a plurality of control signals defining a burst request and including a BLAST signal for controlling termination of said burst mode, and a second series of system addresses identifying data items to be read, said addresses in said second series being in a predetermined order that differs during successive burst modes by being sequential addresses and non-sequential addresses;

said processor being further operative to receive said BURSTRDTY signals and strobe data items from said data path into said processor in response to said BURSTRDY signals;

and converter logic means connected to said bus means and being operative to convert said burst mode signals from said processor into pipelined signals for operating said memory controller, said logic means comprising first means operative in response to said ADS signals and only to the first one of said second series of system addresses from said processor to generate said first series of system addresses that are transmitted to said memory controller with each subsequent system address in said first series being generated and transmitted before corresponding addresses in said second series are generated and transmitted by said processor, said first means being further operative to generate a series of MISS1 signals signifying availability to said memory controller of said second series of system addresses.

2. A data processing system in accordance with claim 1 wherein:

said processor is formed on a chip;

and said chip further comprises a cache having a plurality of cache lines each having a capacity to store a predetermined number of data items, said processor being operative to fill one cache line at a time during said burst mode in accordance with a cache fill sequence, said series of data items corresponding in number to said predetermined number of data items in one of said cache lines.

3. A data processing system in accordance with claim 2 wherein:

said cache fill sequence in each burst mode operation is for data items located at sequential system addresses or at non-sequential system addresses dependent on the system address in said series of the first data item being read.

* * * * *